Patented Mar. 2, 1948

2,437,230

UNITED STATES PATENT OFFICE 2,437,230

RECOVERY OF OLEFINIC HYDROCARBONS

Rupert C. Morris, Berkeley, and Theodore W. Evans, Oakland, Calif., assignors to Shell Development Company, San Francisco, Calif., a corporation of Delaware No Drawing. Application July 1, 1942,
Serial No. 449,326

11 Claims. (Cl. 183—115)

This invention relates to a method for the separation, or purification, or both, of vapor mixtures of narrow boiling range comprising two or more hydrocarbon components of different degrees of saturation, by contacting such a vapor mixture with a relatively high boiling liquid, which liquid is modified to have improved properties for use in said method. More particularly, it relates to a process for separating diolefins, acetylenes, etc., from mono-olefins, paraffins and the like by contacting mixtures of these with certain water-soluble organic solvents whose properties for separation according to said method have been improved by the addition of water.

Processes of this type may be carried out in either of two principal ways. In the first, the vapor may be scrubbed by the relatively high boiling selective solvent in a spray, packed, or bubble plate tower by a stream of selective solvent flowing countercurrently to the vapor. In the second method, the so-called extractive distillation, the solvent is caused to flow down a distillation column as the distillation proceeds and as the vapors ascend from the kettle. Thus, the solvent scrubs the vapors in a first zone, selectively dissolving the more soluble component, and the resulting fat solvent is partially stripped in a second zone by vapor ascending from the distillation kettle having a higher temperature than the first zone. An improvement over this second method comprises operating the zones of contact substantially isothermally as is explained in our copending application Serial No. 329,482, filed April 13, 1940, now abandoned.

In the above methods the dissolved components are then recovered from the fat solvent by distillation, whereby a lean solvent is produced which is recirculated.

By application of the above methods it is frequently possible to separate constituents of a group of narrow boiling range compounds which would be quite impossible to separate by ordinary distillation methods.

The practicability of any such process depends on a number of factors, such as the relative volatilities of the dissolved materials, the concentrations of the solutes, the stability of the solvent, and the ease of separation of solutes and solvent. These factors vary with the temperature and pressure of the operation. This complexity prevents the setting up of a simple criterion for evaluating the "efficiency" of the process, and more particularly for evaluating the part played by the solvent in the determination of the final efficiency. Therefore, progress must, for the most part, be made on an empirical basis.

It is the object of our invention to improve the efficiency of solvents employed in vapor-liquid processes for the separation or purification of hydrocarbon compounds of different degrees of saturation.

Many different solvents have been proposed for use in such processes, e. g. furfural, dioxane, chlorex, aniline, glycol monoacetate, glycol diacetate, glycol monomethyl ether, etc. U. S. Patent 1,875,311 discloses the use of 95% ethyl alcohol and other water-soluble polyhydroxy compounds such as ethylene and propylene glycol.

We have discovered that the addition of water to certain solvents other than simple alcohols improves them for the removal of diolefins such as butadiene or acetylenes from a gaseous mixture comprising mono-olefins, paraffins and the like, which are commonly associated with di-olefins. Our aqueous solvents so obtained are superior to the aqueous ethyl alcohol and other polyhydroxy alcohols heretofore used for the purpose.

The solvents which we have discovered to give increased efficiency by the addition of water thereto when employed under the conditions described above are acetonitrile, propionitrile, and lactonitrile. Of these we prefer water solutions of acetonitrile because of their availability and because they have been found to have a high degree of selectivity for diolefins.

Our water-modified solvents may be used either alone or mixed, and they are in general suitable for the separation in vapor-liquid extraction processes of hydrocarbons of greater degree of saturation from hydrocarbons of lesser degree of saturation, said hydrocarbons having boiling temperatures substantially below that of water and the solvent employed, being applicable to the separation of acetylene from ethane or ethylene, ethylene from ethane, propylene from propane, butadiene from butylenes, butane, etc., butylenes from butane, pentadienes such as isoprene from fractions containing five carbon atoms, cyclopentadiene from cyclopentane or pentenes, etc.

The optimum amount of water to add to the solvent to improve it varies with the particular solvent in question and the substances to be separated, but in general amounts between 10 mol per cent and 68 mol per cent, and preferably between 26 mol per cent and 62 mol per cent, are suitable. The most suitable amount for a given separation may be found by experiment as the result of a compromise between the reduced absolute solubility of the unsaturated hydrocarbon in the solvent and the increased degree of selectivity for the hydrocarbon. It is obviously impractical to employ so large an amount of water that the absolute solubility becomes negligible even if the selectivity is increased by such high dilution.

The most suitable operating temperature varies with the pressure maintained during the operation and is also a compromise, since in general the selectivities of these solvents seem to increase with an increase in temperature, while simultaneously there is a decrease in the absolute solubility as the temperature is increased, so that at the boiling temperature of the solvent at the existing pressure substantially no hydrocarbon will dissolve no matter how high the "selectivity" might become. In general, we prefer to operate at a temperature substantially below the boiling point of the solvent but slightly above the condensation temperature of the most readily condensable constituent of the vapor at the existing pressure. For example, when employing an acetonitrile-water solution containing about 45 mol per cent of acetonitrile and about 55 mol per cent of water as solvent for the separation of butadiene from butylenes, atmospheric temperatures, e. g. about 20° C., are normally most suitable. Substantially atmospheric pressures may be maintained, though the extraction may be carried out either at super- or sub-atmospheric pressures if care is taken to adjust the temperature so that the mixture to be extracted does not condense and the solvent does not vaporize excessively. It is sometimes desirable to operate under super-atmospheric pressure. For example, when operating under 25 to 100 lbs. gauge pressure for butadiene separation, not only the column size is reduced but also the thermal requirements are appreciably lowered compared to those needed at atmospheric pressure. Also, a super-atmospheric pressure is useful to suppress foaming of the solvent.

The amount of the solvent should be at least sufficient to dissolve a major portion of the constituent to be extracted. In some cases a considerable excess over this amount may be used especially when it is desired to scrub the last traces of the more soluble constituent from the vapor. The most economical amount varies with the nature of the solvent involved, the temperatures and pressures employed, and the particular mixture to be extracted. It can be found by experiment.

Regeneration of the solvent may be carried out by any of the conventional methods such as heating, and/or the reduction of pressure, and the thus-regenerated solvent may be returned to the contact zone for use in another cycle.

The suitability of our water-modified nitrile solvents for the purification and/or separation of vapor mixtures of narrow boiling range comprising two or more hydrocarbon components having different degrees of saturation is illustrated by determinations made with a hydrocarbon mixture consisting of 50% butadiene and 50% beta-butylene. Using non-aqueous acetonitrile, in a solution containing 25% solvent and 75% hydrocarbon, the relative volatility of beta-butylene to butadiene at a pressure of about three and one-half atmospheres and at substantially room temperature was found to be only 1.27, whereas when a solvent consisting of 55.5 mol per cent acetonitrile and 45.5 mol per cent water was substituted the relative volatility under the same conditions was increased to 1.41. It will be understood that relative volatility is a direct measure of the ease of separation of components by a distillation process. The difference of .14 betwen the above ratios thus means that when aqueous or water-modified acetonitrile is employed in lieu of anhydrous acetonitrile as the selective solvent in the separation of a hydrocarbon mixture comprising butadiene and beta-butylene, a column of smaller dimensions containing fewer plates may be used and/or fuel and cooling water consumption may be greatly reduced to the economic enhancement of the separation.

The saving possible through the use of our water-modified nitrile solvents is indicated by the results of plate calculations made according to the graphical method of McCabe and Thiel employing equilibrium data obtained in the determination of the foregoing ratios. These results show that in order to obtain products of 98% purity from a butadiene/beta-butylene mixture containing 50 mol per cent of each component a column of 52 theoretical plates operated at a 20:1 reflux ratio would be necessary using anhydrous acetonitrile as the selective solvent while with our water-acetonitrile solvent (45 mol per cent water, 55 mol per cent acetonitrile) products of the same purity can be achieved by operating with a column containing 14 fewer plates and at a reflux ratio of only 10:1. It is significant that the vapor pressure curves on which the plate calculations are based were plotted from the measurements made in connection with the relative volatility determinations, because these measurements, as stated, were taken under a super-atmospheric pressure of about three and one-half atmospheres, which pressure avoids the necessity for refrigeration of the still head.

It is to be understood that when our water-modified nitrile solvents are applied to the separation of a gaseous mixture comprising butadiene and a butylene as, for example, beta-butylene, and/or a butane that the component extracted and subsequently regenerated from the fat solvent following separation of the residual gas therefrom is butadiene.

This application is a continuation-in-part of our copending application Serial No. 332,366, filed April 29, 1940, now U. S. Patent 2,371,908.

We claim as our invention:

1. A process for the separation of butadiene from butylenes which comprises contacting a gaseous mixture of butadiene and butylenes with a liquid solvent consisting of acetonitrile and water, and containing about 45 mol per cent of water, to selectively dissolve the butadiene, separating the residual gas from the liquid solution of butadiene, and heating the solution to recover butadiene therefrom.

2. A process for the separation of butadiene from butylenes which comprises contacting a gaseous mixture of butadiene and butylenes with a liquid solvent consisting of acetonitrile and water, and containing from 10 mol percent to about 55 mol per cent of water, to selectively dissolve the butadiene, and separating the residual gas from the liquid solution of butadiene.

3. A process for the separation of butadiene from butylenes which comprises contacting a mixture of butadiene and butylenes with a liquid solvent which consists of water and a solvent of the group consisting of acetonitrile, propionitrile, and lactonitrile, and contains from 10 mol per cent to 68 mol per cent of water, to selectively dissolve the butadiene, and separating the residual hydrocarbons from the liquid solution of butadiene.

4. A process for the separation of a diolefin from a gaseous hydrocarbon mixture containing the diolefin and a more saturated hydrocarbon containing the same number of carbon atoms which comprises contacting the gaseous hydrocarbon mixture with a liquid solvent which consists of water and a solvent of the group consisting of acetonitrile, propionitrile, and lactonitrile, and contains from 10 mol per cent to 68 mol per cent of water, to selectively dissolve the diolefin, and separating the residual gas from the liquid solution of the diolefin.

5. A process for the separation of olefinic hydrocarbons from a mixture of olefinic hydrocarbons and paraffinic hydrocarbons which comprises contacting the mixture with a liquid solvent which consists of water and a solvent of the group consisting of acetonitrile, propionitrile, and lactonitrile, and contains from 10 mol per cent to 68 mol per cent of water, to selectively dissolve the olefinic hydrocarbons, and separating the residual hydrocarbons from the liquid solution of the olefinic hydrocarbons.

6. A process for the separation of an olefin from a paraffin hydrocarbon which comprises contacting a gaseous mixture of an olefin and a paraffin hydrocarbon having the same number of carbon atoms with a liquid solvent which consists of water and a solvent of the group consisting of acetonitrile, propionitrile, and lactonitrile, and contains from 10 mol per cent to 68 mol per cent of water, to selectively dissolve the olefin, and separating the residual gases from the liquid solution of the olefin.

7. A process for the separation of an olefinic hydrocarbon from a gaseous hydrocarbon mixture containing the olefinic hydrocarbon and a hydrocarbon which is more saturated than said olefinic hydrocarbon which comprises contacting the gaseous hydrocarbon mixture with a liquid solvent which consists of water and a solvent of the group consisting of acetonitrile, propionitrile, and lactonitrile, and contains from 10 mol per cent to 68 mol per cent of water, to selectively dissolve the more unsaturated olefinic hydrocarbon, and separating the residual gases from the liquid solvent containing the more unsaturated olefinic hydrocarbon.

8. A process for the separation of pentadiene from more saturated hydrocarbons containing five carbon atoms per molecule, which comprises contacting a gaseous mixture containing pentadiene and a more saturated hydrocarbon containing five carbon atoms with a liquid selective solvent for the pentadiene, which solvent consists of water and a member of the group consisting of acetonitrile, propionitrile and lactonitrile, and contains from 10 mol per cent to 68 mol per cent of water.

9. A process for the separation of isoprene from a more saturated hydrocarbon containing five carbon atoms per molecule, which comprises contacting a gaseous mixture containing isoprene and a more saturated hydrocarbon containing five carbon atoms with a liquid selective solvent for isoprene, which solvent consists of water and a member of the group consisting of acetonitrile, propionitrile and lactonitrile, and contains from 10 mol per cent to 68 mol per cent of water.

10. A process for the separation of an olefinic hydrocarbon from a gaseous hydrocarbon mixture containing the olefinic hydrocarbon and a hydrocarbon which is more saturated than said olefinic hydrocarbon, which comprises contacting the gaseous mixture under superatmospheric pressure with a liquid solvent which consists of water and a solvent selected from the group consisting of acetonitrile, propionitrile and lactonitrile and contains from 10 mol percent to 68 mol percent of water to selectively dissolve the olefinic hydrocarbon from the mixture.

11. A process for the separation of butadiene from butylenes which comprises contacting a gaseous mixture of butadiene and butylenes under a pressure of at least 3½ atmospheres with a liquid solvent consisting of acetonitrile and from 10–55 mol percent water to selectively dissolve the butadiene.

RUPERT C. MORRIS.
THEODORE W. EVANS.

REFERENCES CITED

The following references are of record in the file of this patent:

UNITED STATES PATENTS

| Number | Name | Date |
|---|---|---|
| 1,813,946 | Nicodemus | July 14, 1931 |
| 1,875,311 | Voorhees et al. | Aug. 30, 1932 |
| 1,882,978 | Schmidt | Oct. 18, 1932 |
| 2,162,963 | McKittrick | June 30, 1939 |
| 2,290,636 | Deanesby | July 21, 1942 |
| 2,366,360 | Semon | Jan. 2, 1945 |
| 2,366,361 | Semon | Jan. 2, 1945 |
| 2,371,908 | Morris | Mar. 20, 1945 |
| 2,379,696 | Evans | July 3, 1945 |

FOREIGN PATENTS

| Number | Country | Date |
|---|---|---|
| 441,104 | Great Britain | Jan. 13, 1936 |
| 495,304 | Great Britain | Nov. 10, 1938 |
| 548,734 | Great Britain | Oct. 22, 1942 |

OTHER REFERENCES

Chem. Abstracts, vol. 29, p. 6034 (1935), Moor.